Sept. 19, 1939.   C. W. SCHRAMM   2,173,183
CROSS-TALK MEASUREMENT
Filed July 17, 1937
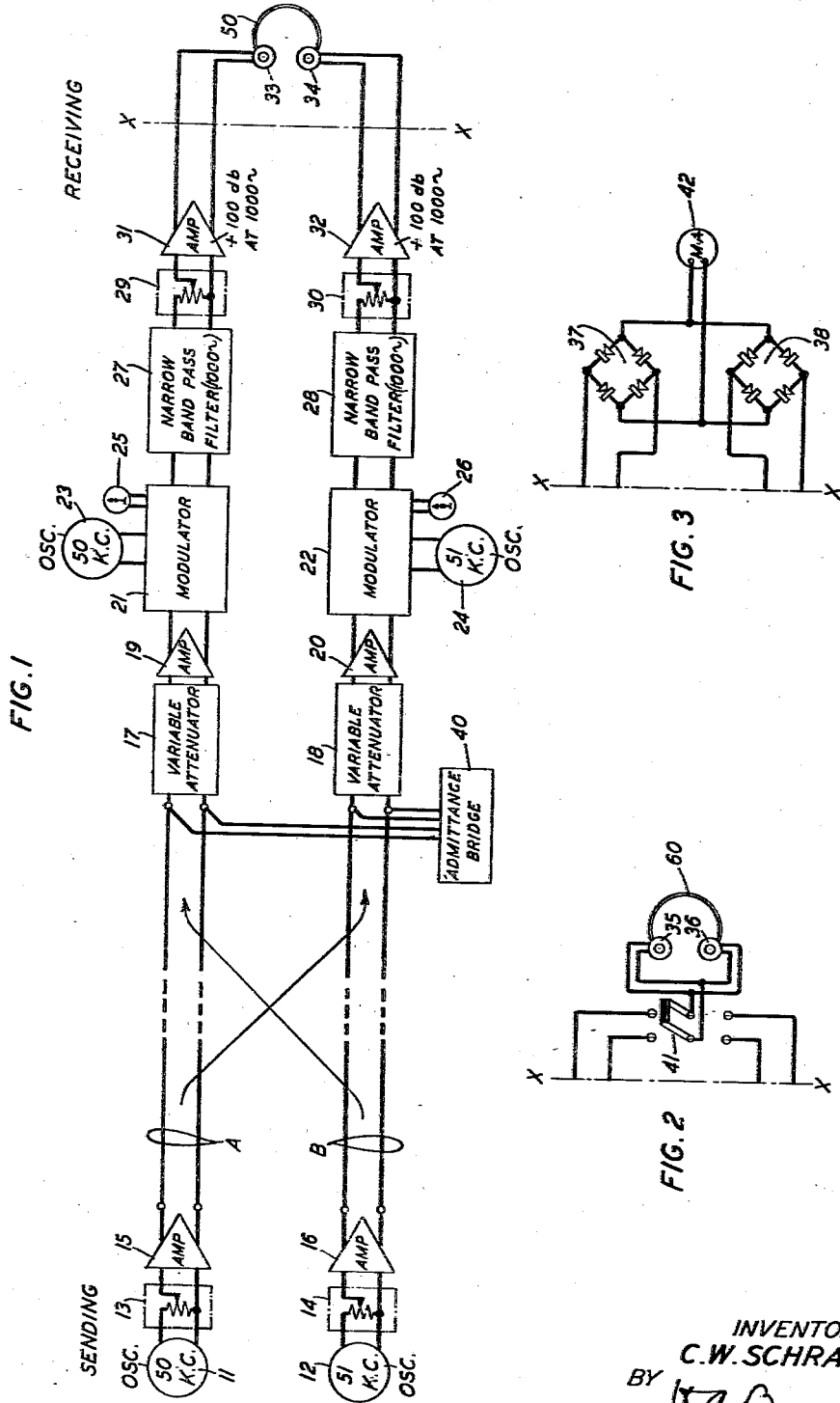
INVENTOR
C. W. SCHRAMM
BY J. A. Burgess
ATTORNEY Patented Sept. 19, 1939

2,173,183

UNITED STATES PATENT OFFICE 2,173,183

CROSS-TALK MEASUREMENT

Charles W. Schramm, Nutley, N. J., assignor to Bell Telephone Laboratories, Incorporated, New York, N. Y., a corporation of New York Application July 17, 1937, Serial No. 154,167

12 Claims. (Cl. 179—175.3)

This invention relates to transmission measurement in carrier current systems, and to measurements applicable more particularly to effecting a compromise balance of cross-talk between conductor pairs in carrier cable systems.

The closely packed relation of twisted pairs in a cable or an open wire line on the same row of poles brings the carrier current circuits into such close proximity to each other that, notwithstanding the fact that the twisting or transposing of the conductors balances out for the most part the inductance and capacity effects of one circuit with relation to another, there usually remain slight dissymmetries which produce some degree of cross-talk between the carrier circuits. The tendency for cross-talk to occur increases with frequency; and as the frequencies employed in cable carrier systems may run as high as 60 kilocycles or higher, it is the practice to minimize cross-talk by connecting measured reactance units between each pair and every other pair. These units have the effect of compensating for and balancing between carrier circuits the unbalanced mutual inductance and capacity that arise from such dissymmetries.

Heretofore, it has been the practice to select balancing reactance units upon the basis of a test wherein a signal is applied to one end of one of the pairs under test and is measured at the other end of the other pair under test, each pair being terminated during the test with its characteristic impedance. Then the compensating reactance is connected between the two pairs and adjusted so that the signal energy or cross-talk transferred from the disturbing pair to the disturbed pair is precisely balanced out.

It has been found that, due to slight differences in the distributed capacities and attenuations between pairs, cross-talk communicated from the first pair to the second is frequently different from that communicated from the second to the first. From this it is evident that the interconnected compensating reactance between any two pairs being tested for cross-talk, in order to be effective to reduce the reciprocal cross-talk to the lowest level, must be a reactance which is a comprise representing the mean of the two values obtained when the cross-talk transmission is first in one direction and then in the opposite direction. Such compromise balancing is desirable when there is a large number of carrier pairs in the same cable, so as to reduce in each pair the over-all noise level that results from the cumulative effect of cross-talk from all pairs.

It is the object of the present invention to provide a method of and apparatus for expeditiously measuring and correcting such cross-talk in carrier systems.

The preferred embodiment of the present invention herein disclosed will be understood by reference to the appended description, taken in connection with the accompanying drawing, in which:

Fig. 1 illustrates schematically two pairs of conductors that are to be balanced with respect to each other; and Figs. 2 and 3 illustrate alternative forms of balance indicating devices.

Referring to Fig. 1, conductor pairs A and B represent two pairs of a multiconductor carrier cable to be balanced for cross-talk effects therebetween. These cross-talk effects, due to dissymmetries of unbalanced mutual inductance and capacity between the pairs, are indicated by arrowheaded curved lines extending in opposite directions between the pairs. It is to be understood that these pairs may also be a section of an open wire line mounted on the same row of poles.

For the purpose of illustration, it may be assumed that the section of carrier cable to be measured and balanced with respect to cross-talk is seventeen miles long, and this is one of a plurality of such sections extending between a series of telephone repeater stations, which sections, when joined together through their respective repeaters, constitute the complete cable transmission line. Each pair of conductors in the carrier cable may accommodate a plurality of carrier channels, depending on the frequency band utilized for each channel and separation therebetween.

The cable is measured for cross-talk and balanced therefor section by section; and at some point along each section there is provided a balancing panel, or plurality of balancing panels, upon which the balancing reactance units are mounted. This sectional balancing panel is arranged to accommodate a balancing unit for interconnecting each pair with every other pair in the section. For example, in the case of a one-hundred pair carrier cable provision is made on the balancing panel for 4950 balancing units. The general arrangement of cross-talk balancing panels and reactance units, and the relation of the balancing units to the carrier conductor pairs may be of a type disclosed in the patent of A. G. Chapman No. 1,863,651, issued June 21, 1932, or the patent of O. H. Coolidge et al. No. 2,008,061, issued July 16, 1935.

To effect the measurement and the balancing of carrier frequency cross-talk between the pairs A and B shown in Fig. 1, energy from a 50-kilocycle oscillator 11 is applied to the sending terminal of pair A through a volume controlling potentiometer 13 and an amplifier 15, and energy from a 51-kilocycle oscillator 12 is applied through a volume controlling potentiometer 14 and amplifier 16 to the sending terminal of pair B. It is understood that oscillators 11 and 12 may be set at any frequency in the carrier band at which cross-talk measurements are desired.

At the receiving end of the section the energy transmitted over pair A passes through a terminating variable attenuating network 17 to amplifier 19 whose output is passed into modulator 21. Associated with the latter is a variable 50-kilocycle oscillator 23 and a rectified-current or direct-current meter 25. The rectified current may be obtained by associating a copper-oxide bridge with the meter in the well-known manner. The portion of the output of the modulator 21 which is to be employed in cross-talk measurement and balancing passes through an adjustable narrow band-pass filter 27 and a gain control device 29 to be impressed on a high gain amplifier 31. The output of the high gain amplifier 31 is applied to responsive element 33 of a balancing indicating device 50 which, in the arrangement shown in Fig. 1, is a telephone receiver.

In like manner the terminals of pair B at the receiving end are connected by way of terminating variable attenuating network 18 to amplifier 20 whose output is connected to a modulator 22 with which is associated a variable 51-kilocycle oscillator 24 and a rectified-current or direct-current meter 26. The portion of the output of modulator 22 employed in cross-talk measuring and balancing passes through adjustable narrow band-pass filter 28 and gain control device 30 to a high gain amplifier 32 whose output is applied to the other responsive element 34 of the balance indicating device 50.

The receiving amplifiers 15 and 16, 19 and 20, and 31 and 32 are of a type used in the carrier system, hence each conductor pair is tested under a condition similar to that prevailing in actual operation.

In the operation of the system the sending oscillators 11 and 12 are adjusted to simultaneously produce alternating currents differing from each other by some audible frequency, such as 1000 cycles. These currents are set at some convenient frequency, preferably within the range of frequencies utilized as carriers in the channels transmitted over the pairs A and B, such, for example, as 50-kilocycles and 51-kilocycles as indicated in Fig. 1. The volume controlling potentiometers 13 and 14 and their associated amplifiers 15 and 16 are so adjusted that the power outputs from the amplifiers 15 and 16 to the respective pairs are at a convenient testing level, for example of the order of 2 watts.

At the receiving end the variable oscillators 23 and 24 associated with the modulators 21 and 22 connected to the pairs A and B, respectively, are so adjusted that each gives a zero beat with the sending oscillators 11 and 12, the zero beat being indicated in each case by the respective rectified-current meters 25 and 26. Thus, slight variations in the sending oscillators are compensated for in the adjustable receiving oscillators, hence precise adjustments of sending oscillators are unnecessary; and in addition, the modulated output of modulator 21 corresponds exactly with that of modulator 22. The 50-kilocycle or 51-kilocycle cross-talk passing between the pairs is of insufficient magnitude to cause any interference with the respective zero beat indications.

Accordingly, the portion of the 51-kilocycle current transmitted over pair B and communicated as cross-talk to pair A beats with the 50-kilocycle current from oscillator 23 in modulator 21, and the modulated component of 1000 cycles is passed by the narrow band-pass filter 27; while at the same time the portion of the 50-kilocycle frequency from oscillator 11 applied to pair A and communicated as cross-talk to pair B beats with the 51-kilocycle frequency from oscillator 24 in modulator 22, and the modulated component of 1000 cycles is passed by the narrow band-pass filter 28. These modulated components represent cross-talk currents passing from each pair to the other, and after amplification in the amplifiers 31 and 32, are impressed on the respective elements of the telephone receiver 50.

However, in order that a balance may be indicated in the telephone receiver 50 only in the case when the cross-talk currents are in fact equal, it is first necessary to calibrate the receiving apparatus. This is done by reversing the connections at the receiving end. That is, the branch which includes the pad 17 and the other odd-numbered receiving devices is connected with the receiving terminals of pair B, and the branch which includes the pad 18 and the other even-numbered receiving devices is connected with the receiving terminals of pair A. With the receiving ends reversed, a 1000 cycle tone will occur in the output of each modulator. After the pads 17 and 18 have been adjusted to introduce substantial attenuation, for example 50 decibels, to avoid overloading the receiving equipment, volume controlling potentiometers 29 and 30 are adjusted until a balance of the two 1000 cycle tones is obtained in the telephone receiver 50.

Calibration in this manner makes it unnecessary to equalize the power output of the sending oscillators 11 and 12, since adjustment of the receiving volume controlling potentiometers 29 and 30 effects an equalization of each complete circuit with respect to the other including both the sending power and the receiving gain. If, for instance, it be assumed that the power delivered into pair A at the sending end is in excess of the power delivered into pair B at the sending end, in order to obtain a balance in the telephone receiver 50 the gain through the branch including the even-numbered elements, now connected with pair A for the purpose of calibration, must be proportionately less, and the gain through the branch including the odd-numbered elements, now connected with pair B for the purpose of calibration, must be proportionately greater.

As the cross-like effect of pair A, with its greater power input under the conditions assumed, on pair B is greater than the cross-talk effect of pair B, with its small power input, on pair A, the result is that when the connections of the two branches at the receiving end are shifted back to the normal testing condition illustrated in Fig. 1, the greater energy-transfer from pair A to pair B is compensated for by the smaller gain to which the calibrating operation has adjusted the even-numbered devices of the branch normally connected to pair B; while the smaller energy-transfer from pair B, on account of its smaller power input, to pair A is compensated for by the greater gain to which the calibration has adjusted the odd-numbered devices of the branch normally connected to pair A. Therefore, regardless of the disparity in power impressed on the two pairs at the sending end, the energy flowing to the two responsive elements of the telephone receiver 50 will be equal when the cross-talk effects of each pair upon the other are in fact equal.

It is to be understood that whatever amount of attenuation is introduced into the receiving ends of the pairs A and B for the calibrating operation, that same amount is removed when the receiving ends are switched back to their normal positions.

In effecting the compromise balance between the two pairs under test, it may be assumed, for the purpose of illustration, that the balancing panel and units mentioned hereinbefore are associated with the pairs at the receiving end of the cable section under test, and that admittance bridge 40, preferably of a type shown and described in connection with Fig. 5 in the patent of A. G. Chapman, supra, is connected with the pairs A and B. The balancing units and their mounting panel are not shown in Fig. 1, and therefore it may be assumed that these are generally similar to corresponding units in the patent of A. G. Chapman, supra.

Having calibrated the cross-talk measuring apparatus in the manner described, and thereafter having readjusted the variable attenuating networks 17 and 18 to remove the amount of attenuation that was introduced for the calibration operation so as to maintain the calibrated equality of the compensating gains in the two branches, the operator at the receiving end adjusts the admittance bridge 40 until a balance is obtained in the telephone receiver 50. The setting of admittance bridge 40 having been recorded, the measured reactance units associated with the receiving ends of the pairs A and B are then connected thereto in accordance with the reading of the admittance bridge. This operation establishes a compromise balance between the pairs A and B such that the reciprocal cross-talk therebetween is a minimum.

The telephone receiver 50 shown in Fig. 1 operates on the binaural principle. That is, when a balance is obtained, the cross-talk tone sensation impressed on the ears by the two telephone receiver elements 33 and 34 is such as to create the impression that the cross-talk tone is coming from directly in front of or from a point midway between the two receiver elements.

It is to be understood that the oscillators 23 and 24 associated with the respective pairs A and B may be omitted without impairing the operation of the invention described above. In such case the current produced by the 50-kilocycle oscillator 11 at the sending end of the pair A and transmitted thereover would serve as the modulating current at the receiving end thereof. This current would beat with the 51-kilocycle current produced at the sending end of the pair B and communicated to pair A as cross-talk. Similarly, the current produced by the 51-kilocycle oscillator at the sending end of the pair B and transmitted thereover would serve as the modulating current at the receiving end thereof. This current would beat with the 50-kilocycle current produced at the sending end of the pair A and communicated to the pair B as cross-talk. Thus, modulated components of 1000 cycles are provided for the purpose mentioned above.

Another arrangement for obtaining an indication of balance is illustrated in Fig. 2. In this it is understood that the organization of Fig. 2 is substituted for the binaural-indicating arrangement shown to the right of line x—x in Fig. 1. Each branch of the measuring circuit is connected to a separate pair of contacts of the double-pole double-throw switch 41 whose contacts associated with the movable switch-arm are connected in parallel with the responsive elements 35 and 36 of a telephone receiver 60. In this arrangement, as the admittance bridge 40 is adjusted, the movable arm of the switch 41 is shifted between its upper and lower positions until a point is reached in the adjustment of the admittance bridge 40 where an impression of equal loudness on the ear is obtained, regardless of the position of the movable switch arm. As in Fig. 1, the reading of the admittance bridge 40 indicates what balancing units are necessary to establish a compromise balance between pairs A and B such that reciprocal cross-talk therebetween is a minimum.

In the balance-indicating arrangement shown in Fig. 3, two full-wave copper-oxide rectifiers 37 and 38 and a direct-current meter 42 may also be substituted for the binaural-indicating device shown to the right of the line x—x in Fig. 1. The outputs of the rectifiers 37 and 38 are connected with each other and with the milliammeter 42 such that the rectified output-currents are equal and cancel each other in their effect upon the milliammeter 42 when the cross-talk from pair A to pair B is equal to the cross-talk from pair B to pair A. This equality is obtained by adjusting the admittance bridge 40 whose final setting indicates what balancing units are necessary to establish a compromise balance between pairs A and B so that the reciprocal cross-talk therebetween will be a minimum.

If the carrier cable system is one in which the balancing panel and the reactance units are located at the mid-point of the cable section, then it is desirable that both the admittance bridge 40 and the balance-indicating device be located at the same point so that the balance-indicating device shall be under the direct observation of the operator who is adjusting the admittance bridge to obtain the condition of compromise balance. This arrangement is most conveniently effected by employing the arrangement illustrated in Fig. 3 and extending a pair of conductors back through the cable from the outputs of the rectifiers 37 and 38 to the meter 42. In this case, for the convenience of the receiving-end operator in effecting a preliminary calibration, there may also be located at the receiving end of the cable section an additional meter in parallel or in series with the meter 42. This will provide the receiving operator with a reading corresponding with that on the meter 42 located at the mid-point of the cable section.

While the invention has been particularly described for use with a carrier cable, it is to be understood that it is applicable with equal facility to open-wire carrier circuits.

What is claimed is:

1. The method of measuring cross-talk between two conductor pairs extending together for a certain distance which comprises simultaneously applying to both pairs alternating currents differing from each other by an audible frequency, and observing the magnitude of the cross-talk simultaneously transferred from each pair to the other and represented by the audible frequency.

2. The method of measuring cross-talk between two conductor pairs extending together for a certain distance which consists in simultaneously applying different tones to the remote ends of the pairs, simultaneously modulating these tones at the near end of each of the pairs, and observing at the modulating point the cross-talk represented by modulated components of the tones applied to the pairs.

3. The method of measuring cross-talk between two conductor pairs extending together for a certain distance which consists in applying alternating current of one frequency to the opposite ends of one pair, applying at the same time an alternating current of another frequency to the opposite ends of the other pair, modulating the currents flowing in each pair to produce a zero beat of frequencies applied thereto, and simultaneously measuring in both pairs the cross-talk represented by modulated components of the currents applied to the pairs.

4. In combination with two conductor pairs extending together for a certain distance, means for applying to the remote ends of the pairs alternating currents differing from each other by an audible frequency, means at the near end of the pairs for modulating the currents flowing therein, and means for observing at the near end the audible frequency represented by modulated components of the currents flowing in each pair.

5. The method of measuring cross-talk between two conductor pairs extending together for a certain distance which consists in applying alternating current of one frequency to a remote end of one pair, applying at the same time alternating current of another frequency to a remote end of the other pair, modulating the currents received at the near end of each pair, and observing at the near ends of the pairs cross-talk represented by modulated components of the currents flowing in the pairs.

6. In combination with two conductor pairs extending together for a certain distance, means for applying to the remote ends of the pairs alternating currents differing from each other by an audible frequency, means for applying to the near ends of the pairs alternating currents corresponding to the currents applied to the remote ends thereof, means for deriving from the currents flowing in each pair at the near end thereof a modulated component corresponding to the audible frequency and representing cross-talk transferred between the pairs, and means for comparing cross-talk in the respective pairs.

7. In combination with two conductor pairs extending together for a certain distance, means for applying to the remote ends of the pairs alternating currents having a frequency difference, means for applying to the near ends of the pairs alternating currents corresponding to the currents applied to the remote ends thereof, means for modulating at the near ends of the pairs the currents flowing therein, means for selecting in each pair a modulated component having a frequency corresponding to the frequency difference between the currents therein and representing cross-talk transferred from the other pair thereto, and means for comparing cross-talk in the respective pairs.

8. In combination with two conductor pairs extending together for a certain distance, means for producing alternating currents of different frequencies at the remote ends of the pairs, means for applying one of the currents to each of the pairs, means for producing at the near ends of the pairs alternating currents corresponding to the currents produced at the remote ends thereof, means for modulating the currents received at the near end of each pair and the current produced thereat and corresponding to the current applied to the remote end thereof, and means for comparing modulated components corresponding to the difference frequency between the currents in the pairs and representing cross-talk transferred from each pair to the other.

9. In combination with two conductor pairs extending together for a certain distance, means for producing two alternating currents of different frequencies at the remote ends of the two pairs, means for applying one of the two currents to the remote end of the first pair, means for applying the other of the two currents to the remote end of the second pair, means for producing at the near ends of the pairs two alternating currents having frequencies corresponding to the currents produced at the remote ends thereof, means for modulating the currents received over the first pair with the current at the near end corresponding to the current applied to the remote end thereof, means for modulating the currents received over the second pair with the current at the near end corresponding to the current applied to the remote end thereof, and means for comparing modulated components having frequencies equivalent to the frequency difference between the currents in the pairs and representing cross-talk transferred from each pair to the other.

10. In combination with two conductor pairs extending together for a certain distance, means for applying alternating current of a certain frequency to the opposite ends of one pair, means for applying alternating current of another frequency to the opposite ends of the other pair, means for modulating the currents flowing in the pairs, and means for comparing modulated components representing cross-talk transferred from each pair to the other.

11. In combination with two conductor pairs extending together for a certain distance, means for applying alternating current of a certain frequency to the opposite ends of the first pair, means for applying alternating current of a different frequency to the opposite ends of the second pair, means for modulating the currents flowing in one end of the first pair, means for modulating the currents flowing in one end of the second pair, and means for comparing modulated components having frequencies equivalent to the frequency difference between the currents in the pairs and representing cross-talk transferred from each pair to the other.

12. In combination with two conductor pairs extending together for a certain distance, means for producing an alternating current of one frequency at a remote end of the two pairs, means for producing an alternating current of another frequency at the remote ends of the two pairs, means for applying current of the one frequency to the remote end of the first pair for transmission thereover, means for applying current of the other frequency to the remote end of the second pair for transmission thereover, means for producing at the near end of the first pair an alternating current of a frequency that is the same as that of the current applied to the remote end thereof, means for producing at the near end of the second pair an alternating current of a frequency that is the same as that of the current applied to the remote end thereof, means for modulating the currents received over the first pair with the current produced at the near end thereof and having the same frequency as that of the current applied to the remote end thereof, means for modulating the currents received over the second pair with the current produced at the near end thereof and having the same frequency as that of the current applied to the remote end thereof, means for selecting from the modulating means associated with the first pair a modulated component having a frequency equivalent to the difference frequency between the currents in the two pairs and representing the cross-talk transferred from the second pair to the first pair, means for selecting from the modulating means associated with the second pair a modulated component having a frequency equivalent to the difference frequency between the currents in the two pairs and representing cross-talk transferred from the first pair to the second pair, and means for comparing the cross-talk in the respective pairs.

CHARLES W. SCHRAMM.